(12) United States Patent
Cheung

(10) Patent No.: US 10,666,857 B2
(45) Date of Patent: May 26, 2020

(54) MODIFYING CAPTURE OF VIDEO DATA BY AN IMAGE CAPTURE DEVICE BASED ON VIDEO DATA PREVIOUSLY CAPTURED BY THE IMAGE CAPTURE DEVICE

(71) Applicant: Facebook, Inc., Menlo Park, CA (US)

(72) Inventor: Vincent Charles Cheung, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/121,087

(22) Filed: Sep. 4, 2018

(65) Prior Publication Data
US 2019/0075238 A1    Mar. 7, 2019

Related U.S. Application Data

(63) Continuation-in-part of application No. 15/856,109, filed on Dec. 28, 2017, now abandoned.
(Continued)

(51) Int. Cl.
*H04N 5/232* (2006.01)
*H04N 5/262* (2006.01)
(Continued)

(52) U.S. Cl.
CPC ......... *H04N 5/23219* (2013.01); *G06F 3/013* (2013.01); *G06F 16/24578* (2019.01); *G06K 9/00369* (2013.01); *G06K 9/00375* (2013.01); *G06K 9/00771* (2013.01); *G06T 7/70* (2017.01); *G06T 7/90* (2017.01); *H04N 5/23296* (2013.01); *H04N 5/232061* (2018.08); *H04N 5/232127* (2018.08); *H04N 5/268* (2013.01); *H04N 5/2628* (2013.01); *H04N 21/4334* (2013.01);
(Continued)

(58) Field of Classification Search
None
See application file for complete search history.

(56) References Cited

U.S. PATENT DOCUMENTS 9,621,795 B1 *  4/2017  Whyte ............... H04N 5/23219
2002/0101505 A1  8/2002  Gutta et al.
(Continued)

OTHER PUBLICATIONS

PCT International Search Report and Written Opinion, PCT Application No. PCT/US2018/049532, dated Jan. 18, 2018, 24 pages.
(Continued)

*Primary Examiner* — Mark T Monk
(74) *Attorney, Agent, or Firm* — Fenwick & West LLP

(57) ABSTRACT

Various client devices include displays and one or more image capture devices configured to capture video data. Different users of an online system may authorize client devices to exchange information captured by their respective image capture devices. Additionally, a client device modifies captured video data based on users identified in the video data. For example, the client device changes parameters of the image capture device to more prominently display a user identified in the video data and may further change parameters of the image capture device based on gestures or movement of the user identified in the video data. The client device may apply multiple models to captured video data to modify the captured video data or subsequent capturing of video data by the image capture device.

22 Claims, 3 Drawing Sheets

Related U.S. Application Data

(60) Provisional application No. 62/554,564, filed on Sep. 5, 2017.

(51) Int. Cl.

| | | |
|---|---|---|
| *H04N 21/44* | (2011.01) | |
| *H04N 21/433* | (2011.01) | |
| *G06K 9/00* | (2006.01) | |
| *G06F 16/2457* | (2019.01) | |
| *G06F 3/01* | (2006.01) | |
| *G06T 7/90* | (2017.01) | |
| *G06T 7/70* | (2017.01) | |
| *H04N 5/268* | (2006.01) | |

(52) U.S. Cl.
CPC ............ *H04N 21/44008* (2013.01); *G06T 2207/30196* (2013.01)

(56) References Cited

U.S. PATENT DOCUMENTS

| | | | | |
|---|---|---|---|---|
| 2005/0179553 | A1* | 8/2005 | Fujie | G08B 13/19613 340/573.4 |
| 2007/0198632 | A1 | 8/2007 | Peart et al. | |
| 2008/0063389 | A1 | 3/2008 | Fang et al. | |
| 2009/0074300 | A1 | 3/2009 | Hull et al. | |
| 2011/0270933 | A1 | 11/2011 | Jones et al. | |
| 2012/0233076 | A1* | 9/2012 | Sutcliffe | G06Q 30/02 705/50 |
| 2013/0335508 | A1 | 12/2013 | Mauchly | |
| 2014/0184726 | A1 | 7/2014 | Kim et al. | |
| 2014/0218283 | A1* | 8/2014 | Choi | G06F 3/017 345/156 |
| 2014/0320587 | A1 | 10/2014 | Oyman | |
| 2015/0146011 | A1* | 5/2015 | Tsubusaki | H04N 5/23296 348/169 |
| 2015/0254855 | A1* | 9/2015 | Patankar | G06K 9/32 382/255 |
| 2016/0134814 | A1* | 5/2016 | Yoneyama | H04N 5/23287 348/208.11 |
| 2016/0269645 | A1 | 9/2016 | Khoe et al. | |
| 2016/0277712 | A1 | 9/2016 | Michot | |
| 2016/0360116 | A1 | 12/2016 | Penha et al. | |
| 2016/0366330 | A1 | 12/2016 | Boliek et al. | |

OTHER PUBLICATIONS

United States Office Action, U.S. Appl. No. 16/121,081, dated Oct. 1, 2019, 19 pages.

\* cited by examiner

MODIFYING CAPTURE OF VIDEO DATA BY AN IMAGE CAPTURE DEVICE BASED ON VIDEO DATA PREVIOUSLY CAPTURED BY THE IMAGE CAPTURE DEVICE

CROSS REFERENCE TO RELATED APPLICATIONS

This application is a continuation-in-part of U.S. patent application Ser. No. 15/856,109, filed Dec. 28, 2017, which claims the benefit of U.S. Provisional Application No. 62/554,564, filed Sep. 5, 2017, which is incorporated by reference in its entirety.

BACKGROUND

This disclosure relates generally to capturing video data, and more specifically to modifying capture of video data based on previously captured video data.

Increasingly, client devices, online systems, and networks allow users to exchange larger amounts of content with each other. For example, an online system allows its users to exchange video data captured by different users via client devices associated with the user. In a specific example, an online system may establish video messaging between a user and an additional user, allowing the users to exchange video data captured by their respective client devices in real-time or in near real-time.

However, when providing video data, conventional client devices require a user to manually configure video capture. For example, a user of a client device provides inputs to the client device to identify a focal point of the client device's image capture device, to specify a magnification of the client device's image capture device, or other parameters of the client device's image capture device. In addition to providing initial inputs identifying parameters of the client device's image capture device, conventional client devices require the user to manually reposition a client device's image capture device to different portions of a local area within a field of view of the client device's image capture device. Hence, a user manually selects and maintains content captured by a client device's image capture device that is communicated to another client device. While this dependence on user-provided input affords the user significant control over video data captured by a client device, conventional client devices do not allow a user to readily perform other tasks in a video messaging session while capturing video data via a client device, as the conventional client devices are unable to adjust video data capture as conditions change without receiving one or more inputs provided by the user.

SUMMARY

Various client devices associated with users of an online system include one or more image capture devices. An image capture device included in a client device is configured to capture video data of a local area surrounding the client device, for example, during a video call or when the user turns on the video capturing feature. Additionally, the client device includes a controller coupled to the one or more image capture devices. The controller applies one or more models to video data captured by an image capture device and modify video data captured by the image capture device or parameters of the image capture device based on application of the one or more models. This allows the controller to modify captured video data based on characteristics or content of video data previously captured by the image capture device.

The controller maintains and enforces one or more privacy settings for users and other people captured in the video data or other data in various embodiments. For example, the controller may have a default privacy setting preventing the controller from identifying a user until the user manually alters the privacy setting to allow the controller to identify the user. The default privacy setting may also extend to any captured video data, audio data, image data, or other data so that a user may select whether to allow the image capture device to identify any user in the data. Additionally, the privacy setting also regulates transmission of information from the client device to another entity (e.g., another client device or a third party system). The various privacy settings allow a user to control the identification of the user and the storage and sharing of any user-related data. The privacy settings also may be enforced individually with respect to each individual. For example, a user opting in a user identification feature may not change the default privacy settings for other users that may be incidentally captured in the local area surrounding the client device.

In various embodiments, based on users' privacy selections to enable the client device to identify the users, the controller applies one or more machine learned models to video data captured by an image capture device to locate the users included in the captured video data. Models applied by the controller to captured video data may perform facial tracking (in two-dimensions or in three-dimensions), two-dimensional pose tracking, three-dimensional pose tracking, or any other suitable method to identify portions of a person's face or portions of the person's body. In various embodiments, the controller modifies captured video data or parameters of the image capture device to more prominently present located users. For example, the controller crops the captured video data to remove portions of the video data that do not include at least one person. As another example, the controller modifies a focal point of the image capture device to a face of a person and increases a magnification (i.e., a zoom) of the image capture device. In various embodiments, users have the options to prevent any recordings (video, voice, etc.) from being stored locally in the client device and/or on the cloud and also to delete any recordings, if saved.

In various embodiments, when the user identification is enabled, one or more models applied by the controller apply one or more rules to modify the video data captured by the image capture device of the client device. For example, the controller modifies captured video data to more prominently display a person located within the video data if the controller also determines a face of the person is directed towards the camera. In another example, the controller determines distances between people identified from the video data and the image capture device and modifies the captured video data so a person having a minimum determined distance from the image capture device is presented by the video data with at least a threshold set of dimensions (e.g., with at least a threshold height and a threshold width, or using at least a threshold percentage of the field of view of the image capture device) or to display people for whom the determined distance from the image capture device is less than a threshold distance with at least the threshold set of dimensions.

The controller may receive data from other components of the client device and modify the captured video data based on characteristics of the received video data and the data from other components of the client device. For example, the image capture device or the client device includes an audio capture device, such as a microphone, configured to capture audio data from the local area surrounding the client device. The controller, subject to user-selected privacy setting, may process the captured audio data along with the captured video data when modifying the captured video data. In various embodiments, the controller applies one or more models to captured audio data to determine a location within the captured video data including a source of the audio data. The controller applies one or more models to the location within the captured video data including the source of the audio data. In response to application of the models determining the location within the captured video data includes the source of the audio data includes a person, the controller modifies the captured video data to more prominently present the location within the captured video data including the source of the audio data or repositions the image capture device to focus on the source of the audio data (e.g., increase a field of view of the image capture device occupied by the source of the audio data, alter a position of the source of the audio data within the field of view of the image capture device). However, the controller does not modify the captured video data or reposition the image capture device in response to determining the location within the captured video data including the source of the audio data does not include a person. As another example, the controller modifies the captured video data or repositions the image capture device to more prominently present a person identified within the captured video data who the controller determines is a source of captured audio data (e.g., increase a field of view of the image capture device occupied by the source of the audio data, alter a position of the source of the audio data within the field of view of the image capture device), allowing the captured video data to more prominently display a user determined to be speaking or otherwise providing audio data captured by the audio capture device of the client device.

In a video messaging session or other situations where the user has turned on the video capturing and the user identification feature, the controller may apply one or more models to video data captured after receiving information identifying the user of interest to modify one or more parameters of the image capture device to follow the user of interest around the local area. For example, the controller applies one or more facial recognition models to people located in captured video data to identify a person's face matching a face of the user of interest (received from the online system, or identified from previously captured video data based on information from the online system) and subsequently repositions a focal point of the image capture device to the person having the face matching the face of the user of interest. Alternatively, the controller extracts a color map from captured video data including the user of interest and repositions the focal point of the image capture device so the extracted color map remains included in video data captured by the image capture device.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
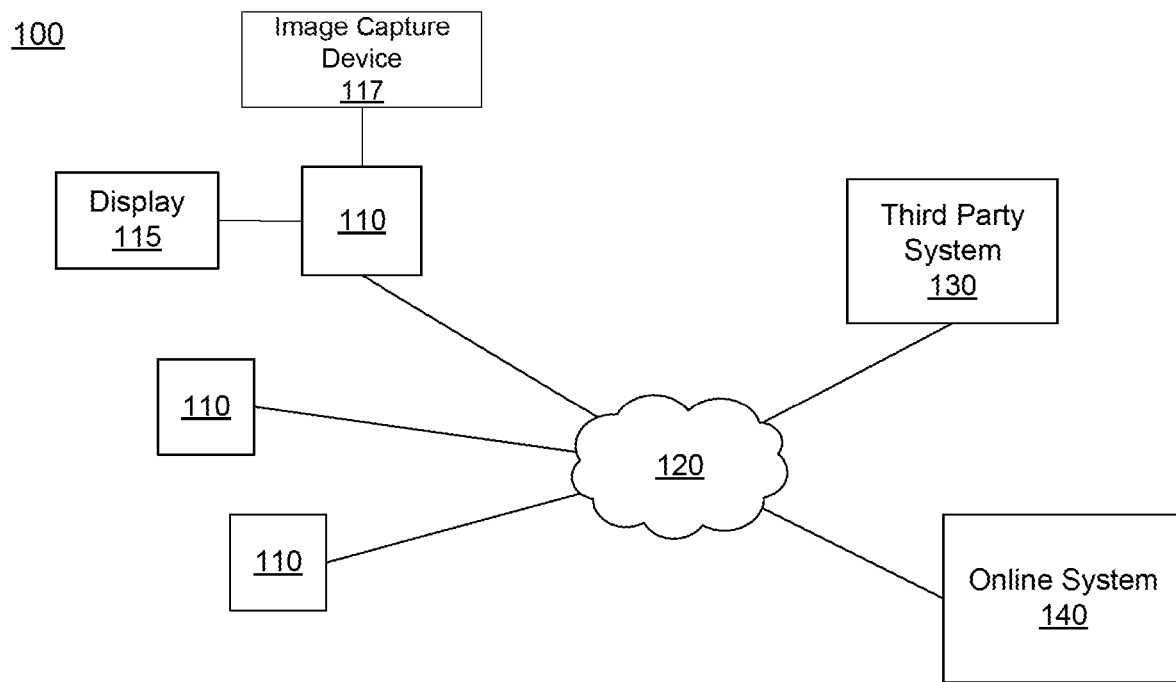
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
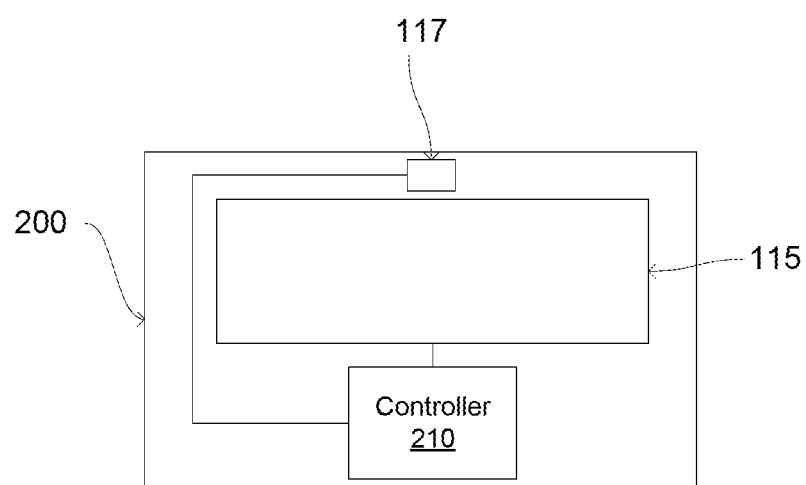
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117. In various embodiments, users have the options to prevent any recordings (video, voice, etc.) from being stored locally in the client device and/or on the cloud and also to delete any recordings, if saved.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117. In various embodiments, the one or more models are applied to video data, audio data, image data, or any combination of data captured by the image capture device 117 or any other devices included in or coupled to the client device 110. As further described below in conjunction with FIG. 4, models applied to captured video data by the controller 210 apply one or more rules to characteristics of captured video data to identify objects, people, movement, or any other suitable content of the captured video data. Based on application of the models and subject to one or more privacy settings, the controller 210 modifies the captured video data or modifies one or more parameters of the image capture device 117 so subsequently captured video data is modified. For example, users may authorize the controller 210 to apply models that locate the users in captured video data based on characteristics of the captured video data and modifies the captured video data to more prominently include the located users or modifies one or more parameters (e.g., focal length, magnification or zoom, cropping of captured video data) of the image capture device 117 so additional video data more prominently includes the located users. The additional video data more prominently includes a located person by presenting the located person with at least a threshold set of dimensions (e.g., with at least a threshold height or a threshold width), presents the located person in at least a threshold amount of a field of view of the image capture device 117 or in at least a threshold amount of a frame of the captured video data, or presents the located person in one or more specific locations within the captured video data. However, models applied by the controller 210 may identify any suitable components of video data captured by the image capture device 117 and modify parameters of the image capture device 117 or modify captured video data accordingly.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210. Subject to user selected privacy settings, the controller 210 applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

The online system 140 and the controller 210 of the client device 110 cooperatively and/or individually maintain and enforce one or more privacy settings for users or people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a first user to specify (e.g., by opting out, by not opting in) whether the online system 140 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 140 may access such information in order to provide a particular function or service to the first user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 140.

The privacy settings maintained and enforced by the online system 140 and/or the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 and/or various components client device 110 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example and not by way of limitation, the online system 140 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the online system 140. As another example and not by way of limitation, the online system 140 may provide a functionality for a user to provide a reference image (e.g., a facial profile) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the system 140. Any of such restrictions on capture biometric and/or other personal data may also be applied to the client device 110.

Users may authorize the capture of data, identification of users, and/or sharing and cross-application use of user-related data in one or more ways. For example, user may pre-select various privacy settings before the users use the features of the client devices 110 and/or take actions in the online system 140. In another case, a selection dialogue may be prompted when users first carry out an action or use a feature of the client devices 110 and/or the online system 140 and/or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

Figure 3:
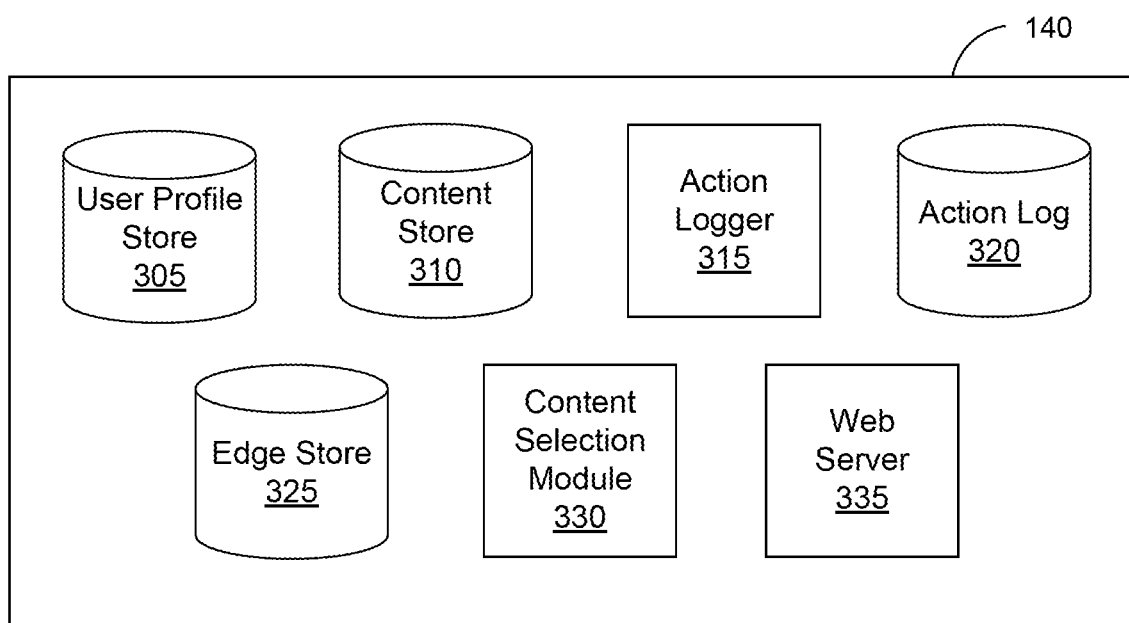
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Based on the privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized by the users to be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140, subject to the privacy settings of the users. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

Based on a user's action or consent, the content selection module 330 receives video data captured by an image capture device 117 included in a client device 110 associated with the user of the online system and transmits the video data to a receiving client device 110 for presentation to a viewing user via a display device 115. The online system 140 may receive a request from the client device 110 that identifies the viewing user, and subsequently provides video data from the client device 110 to the receiving client device 110 in response to receiving an authorization from the viewing user. Conversely, the online system 140 receives a request from the viewing user via the receiving client device 110 and subsequently provides video data received from the client device 110 to the receiving client device 110 in response to receiving an authorization from the user. This allows different users of the online system 140 to exchange video data captured by client devices 110 associated with the users via the online system 140.

Additionally, the content selection module 330 may receive instructions from the viewing user via the receiving client device 110 and transmits one or more of the instructions to the client device 110. Based on the received instruction, the client device 110 modifies video data captured after receiving the instructions or modifies one or more parameters of the image capture device 117 based on the instructions. Hence, the client device 110 modifies captured video data based on the one or more instructions from the receiving client device 110 and transmits the modified video data, or the video data captured by the image capture device 117 using the modified parameters, to the content selection module 330, which transmits the video data to the receiving client device 110, as further described below in conjunction with FIG. 4. This allows the viewing user to modify or adjust the video data captured by the client device 110 and provided to the viewing user via the receiving client device 110.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Figure 4:
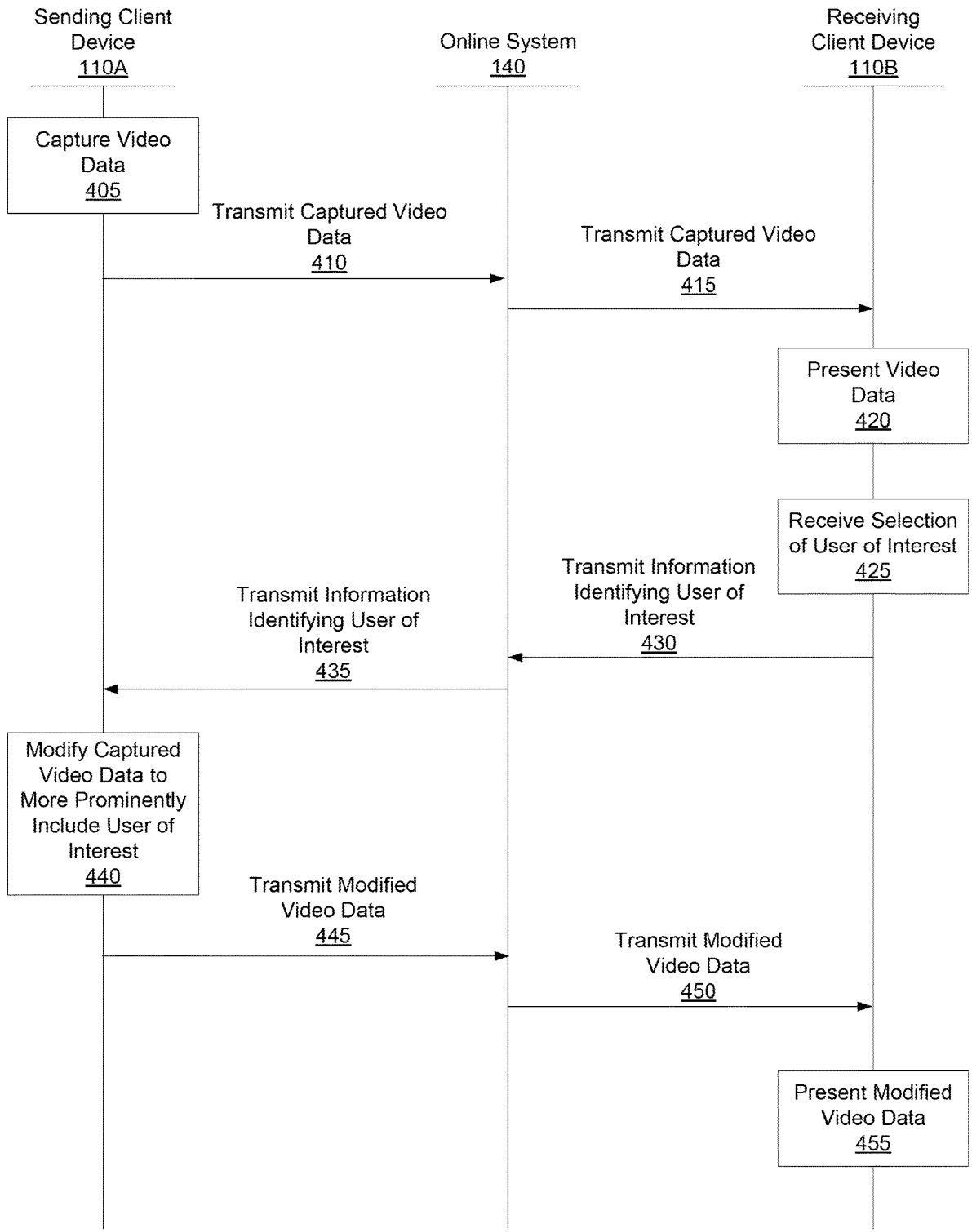
FIG. 4 is a flowchart of a method for selecting a segment of video data for presentation to a user of interest of an online system based on likelihoods of a gaze of the user of interest being directed to different locations within the video data, in accordance with an embodiment.

Modifying Video Data Capture Based on Characteristics of Previously Captured Video Data FIG. 4 is an interaction diagram of one embodiment of a method for modifying capture of video data by an image capture device 117 based on characteristics of video previously captured by the image capture device 117. In various embodiments, the steps described in conjunction with FIG. 4 may be performed in different orders. Additionally, in some embodiments, the method may include different and/or additional steps than those shown in FIG. 4.

The image capture device 117 is included in a sending client device 110A, as further described above in conjunction with FIGS. 1 and 2, and captures 405 video data of a local area surrounding the sending client device 110A. Images captured by the image capture device 117 are communicated to a controller 210 included in the sending client device 110A (or coupled to the client device 110 in other embodiments). In various embodiments, a user may authorize (e.g., through pre-selected privacy settings and/or prompted selections) the controller 210 to apply one or more machine learned models to characteristics of the video captured 405 by the image capture device 117 to locate people included in the captured video data. The controller 210 modifies the video data to more prominently present located users and transmits 410 the modified video data to the online system 140 in various embodiments. A located user is more prominently presented by being presented in the video data with at least a threshold set of dimensions (e.g., with at least a threshold height or a threshold width), being presented in at least a threshold amount of a field of view of the image capture device 117 or in at least a threshold amount of a frame of the captured video data, or being presented in one or more specific locations within the captured video data. For example, the controller 210 crops the captured video data to remove portions of the video data that do not include at least one person. As another example, the controller 210 increases a zoom (also referred to as a magnification) of a portion of the video data including a person. To modify the captured video data, the controller 210 may modify video data after being captured by the image capture device 117 or may modify one or more parameters of the image capture device 117 to modify how the image capture device 117 captures 405 video data.

In various embodiments, the controller 210 applies one or more methods to locate people within the captured video data. However, the controller 210 may similarly locate objects (e.g., appliances, furniture, products) by applying one or more models to the captured video data. While the following examples refer to application of models to video data, one or more models may be applied to video data, audio data, image data, any other data captured by the client device 110, and any combination thereof. The controller 210 may use any suitable model or combination of models to locate people within video data captured 405 by the image capture device 117. Models applied by the controller 210 to captured video data may perform facial tracking (in two-dimensions or in three-dimensions), two-dimensional pose tracking, three-dimensional pose tracking, or any other suitable method to identify portions of a person's face or portions of the person's body. Similarly, models applied by the controller 210 may identify objects from the captured video data. In some embodiments, based on users' authorization, the controller 210 communicates with the online system 140 to more specifically identify objects or people based on information obtained from the online system 140, while in other embodiments, the controller 210 locally maintains models to identify different objects or people from the captured video data. Based on application of the one or more models, the controller 210 may modify cropping or zooming of captured video data including certain portions of a located user's body to more prominently display certain portions of the located user's body. For example, when the one or more models identify a person's face, the controller modifies the captured video data to remove portions of the video data that do not include the person's face. If application of the one or more models locates multiple people in the captured video data, the controller 210 modifies the captured video data so different portions of the video display different people. For example, the controller 210 partitions the captured video data into a grid, with each region of the grid displaying one or more portions of a different person. In other embodiments, the controller 210 increases a magnification (i.e., a zoom) of the image capture device 117 on a portion of the video data including a portion of a person. Hence, the controller 210 may crop portions of the captured video data or increase a magnification (i.e., a zoom) of portions of the captured video data to modify the video data to more prominently present portions of one or more people located within the captured video data. Additionally, when modifying the captured video data based on application of the one or more models, the controller 210 may apply one or more models to stabilize the modified video data to present the portions of one or more located people at a higher quality.

Based on the privacy settings, the controller 210 may also apply one or more models that locate parts of an identified person's body and modify one or more parameters of the image capture device 117 or video data captured by the image capture device 117 to modify portions of a located person's body included in the captured video data. For example, the controller 210 locates different joints of an identified person's body and modifies captured video data or parameters of the image capture device 117 to include joints corresponding to different parts of the located person's body in the captured video data. Hence, the controller 210 may modify whether the captured video data includes a person's head, a person's head and torso, or a person's full body. The controller 210 may include various rules that modify portions of a person's body included in captured video data based on content included in previously captured video data, movement identified in previously captured video data, or any other suitable characteristics identified from the video data.

In various embodiments, one or more models applied by the controller 210 apply one or more rules to modify the video data captured 405 by the image capture device 117 of the sending client device 110A. For example, the controller 210 modifies captured video data to more prominently display a person located from the video data by modifying a zoom of the captured data on a portion of the video data in which the person is located or by modifying cropping a portion of the video data in which the person is located to remove objects other than the person if the controller 210 also determines a face of the person is directed towards the camera. As an example, the controller 210 modifies captured video data to more prominently display a face of user if one or more models applied by the controller 210 determines the person's face is directed towards the image capture device 117 (e.g., if one or more specific features of the person's face are captured by the image capture device 117). In another example, the controller 210 determines distances between people located within the video data and the image capture device 117 and modifies the captured video data to prominently display a person having a minimum determined distance from the image capture device 117 or to prominently display people for whom the determined distance from the image capture device is less than a threshold distance. In another example, the controller 210 applies one or more models to reposition the image capture device 117 as a person or an object moves, allowing video data captured by the image capture device 117 to track movement of the person or the object.

One or more models applied by the controller 210 may modify the captured video data based on rules that account for location of multiple people identified in the captured video data. In various embodiments, the users may authorize the controller 210 to locate the users in the captured video, the controller 210 applies a model to the captured video that determines locations within captured video data where gazes of the identified users are directed. In response to determining at least a threshold number or a threshold amount of located users have gazes directed to a location within the captured video data including a specific person, the controller 210 modifies the captured video data to more prominently display the specific person (e.g., crops the captured video data to remove content other than the specific person, increases a magnification or a zoom of the specific person). As another example, the controller 210 determines distances between different people located within the video data and modifies the captured video data to more prominently display people within a threshold distance of each other; this allows the controller 210 to modify the captured video data by cropping or zooming a portion of the video data in which a group of people are located. Additionally, the controller 210 may remove one or more frames from the captured video data based on objects or people identified within the captured video data; for example, if less than a threshold number of objects or people are identified within the captured video data, or if less than a threshold amount of movement of objects or people identified within the captured video data is determined, the controller 210 removes frames from the captured video data prior to transmitting 410 the captured video data to the online system 140. In other embodiments, the online system 140 removes frames from the video data received from the sending client device 110A using the above described criteria prior to transmitting 415 the captured video data to the receiving client device 110B, as further described below.

The controller 210 may receive data from other components of the sending client device 110A and modify the captured video data based on characteristics of the received video data and the data from other components of the sending client device 110A. For example, the image capture device 117 or the client device 110 includes an audio capture device, such as a microphone, configured to capture audio data from the local area surrounding the client device 110. Users may authorize the controller 210 to process the captured audio data along with the captured video data when modifying the captured video data. In various embodiments, the controller 210 applies one or more models to captured audio data to determine a location within the captured video data including a source of the audio data. The controller 210 applies one or more models to the location within the captured video data including the source of the audio data. In response to application of the models determining the location within the captured video data includes the source of the audio data includes a person, the controller 210 modifies the captured video data to more prominently present the location within the captured video data including the source of the audio data (i.e., increases a zoom of the location including the source of the captured video data or crops the location including the source of the captured video data to remove objects other than the source of the captured video data) or repositions the image capture device 117 to focus on the source of the audio data. However, the controller 210 does not modify the captured video data or reposition the image capture device 117 in response to determining the location within the captured video data including the source of the audio data does not include a person. As another example, the controller 210 modifies the captured video data or repositions the image capture device 117 to more prominently present a person located within the captured video data who the controller 210 determines is a source of captured audio data, allowing the captured video data to more prominently display a person determined to be speaking or otherwise providing audio data captured by the audio capture device of the sending client device 110A (i.e., increases a zoom of a the location including the person determined to be providing audio data or crops the location including the source of the captured video data to remove objects other than the person determined to be providing audio data).

In some embodiments, users may also authorize the controller 210 to apply one or more models to modify captured video data or parameters of the image capture device 117 of the client device 110 based on video data previously captured 405 by the image capture device 117. For example, if the controller 210 locates multiple people in captured video data, the controller 210 modifies the captured video data or one or more parameters of the imaging device 117 so each located person is prominently presented (e.g., presented in the video data with at least a threshold set of dimensions, being presented in at least a threshold amount of a field of view of the image capture device 117 or in at least a threshold amount of a frame of the captured video data, or being presented in one or more specific locations within the captured video data) in the captured video for a minimum amount of time. As another example, subject to the privacy settings, the controller 210 stores information identifying people located in the captured video data who have been prominently presented in the captured video data for at least a threshold amount of time. When the controller 210 locates an additional person in the captured video data, the controller 210 compares the additional person to the stored information identifying people who have been prominently presented in the captured video data. Responsive to determining the additional person is not identified by the stored information, the controller 210 modifies the captured video data or modifies one or more parameters of the image capture device 117 to prominently display the additional person for at least a threshold amount of time. This allows the controller 210 to modify the video data so each person located in the video data by the controller 210 is prominently displayed for at least the threshold amount of time.

Additionally, the controller 210 may modify captured video data or parameters of the image capture device 117 in response to identifying movement of people located in the captured video data. For example, if one or more models applied to captured video by the controller 210 determine a located person is gesturing towards an object, the controller 210 modifies the captured video so the located person and the object are prominently presented. As an example, if the captured video prominently displays the located person (e.g., displays the located person with at least a threshold set of dimensions or displays the located person occupying at least a threshold amount of one or more frames of the video data) and the controller determines the located person is gesturing towards the object, the controller 210 modifies the captured video so the located person and the object are presented in the video data. For example, the controller 210 decreases a magnification of the captured video data so the located person and the object are both included in the captured video. In another example, if the controller 210 applies one or more models that determine a located person is holding an object, the controller 210 modifies the captured video data or one or more parameters of the image capture device 117 so the object is prominently presented (e.g., changes a focal point of the imaging device 117 to the object and increases a zoom of the image capture device 117). The controller 210 may prominently present the object held by the located person in the captured video data for a specific amount of time in some embodiments, and then modify the captured video data or parameters of the image capture device 117 so the located person is again prominently presented by the captured video data.

The sending client device 110A transmits 410 the video data, which may be modified by the controller 210 as further described above, from the sending client device 110A to the online system 140, which transmits 415 the captured video data to a receiving client device 110B. Using a display device 115, the receiving client device 110B presents 420 the video data from the online system 140 to a viewing user of the online system 140. In various embodiments, the viewing user communicates a request to communicate with the sending client device 110A from the receiving client device 110B to the online system 140. The online system 140 communicates the request to the sending client device 110A, which provides a response to the online system 140. If the sending client device 110A provides an authorization to the online system 140 in response to the request, the online system 140 communicates video data captured 405 by the image capture device 117 of the sending client device 110A and provided to the online system 140 to the receiving client device 110B for presentation on a display device 115, and vice versa.

In various embodiments, a user may authorize the sending client device 110A (e.g., based on pre-determined privacy settings and through user actions) to provide information identifying one or more users corresponding to people located within the captured video by the controller 210 to the online system 140, which includes information identifying the one or more users with the video data transmitted 420 to the receiving client device 110B. Alternatively, the sending client device 110A identifies portions of the video data including people located by the controller 210 to the online system 140, which compares the portions of the video data in which the controller 210 located people to stored images identifying online system users. Based on the privacy settings, the online system 140 retrieves information identifying users identified by stored images determined by the online system 140 as having at least a threshold similarity of portions of the video data the controller 210 of the sending client device 110A in which the controller 210 located people. This allows the online system 140 to identify users of the online system 140 included in the video data received from the sending client device 110A if the users opt in to such identification feature. The online system 140 may apply one or more facial recognition process, or other identification processes, to a portion of the received video data in which a person was located by the controller 210 and images stored by the online system 140 identifying users (e.g., profile pictures in user profiles of users, images including faces of users in which users are tagged with identifying information) to determine whether the person located in the portion of the received video data is an online system user.

For example, the online system 140 augments the video data from the sending client device 110A so information identifying an online system user (e.g., a first name and a last name, an email address) is overlaid on a portion of the video data from the sending client device 110A including a person identified by the online system 140 as the online system user. The online system 140 transmits 420 the augmented video data to the receiving client device 110B. Alternatively, the online system 140 generates information identifying online system users corresponding to people located in the video data received from the sending client device 110A and transmits the information identifying the online system users corresponding to people in the video to the receiving client device 110B along with the video data. For example, the online system 140 generates a list of first names and last names or a list of usernames of online system users corresponding to people in the video data received from the sending client device 110A for presentation by the receiving client device 110B to a viewing user in conjunction with the video data.

In some embodiments where users authorize the use of various user-related data to improve the user experience of the online system 140, the online system 140 may account for affinities between a viewing user associated with the receiving client device 110B and users identified from the video data received from the sending client device 110A when generating information identifying online system users corresponding to people located in the video data received from the sending client device 110A. For example, the online system 140 generates identifying information for online system users identified from the video data received from the sending client device 110A who have a connection to the viewing user maintained by the online system 140; the online system 140 may not generate identifying information for online system users identified from the video data received from the sending client device 110A who do not have a connection to the viewing user in some embodiments. Alternatively, the online system 140 visually distinguishes identifying information of online system users identified from the received video data who are connected to the viewing user from identifying information of online system users who are not connected to the viewing user. As another example, the online system 140 determines affinities of the viewing user for each online system user identified from the video data received from the sending client device 110A and modifies presentation of identifying information of online system users identified from the video data. For example, the online system 140 generates information identifying online system users identified from the received video data that visually distinguishes identified online system users for whom the online system 140 determines the viewing user has at least a threshold affinity. As another example, the online system 140 ranks information identifying online system users identified from the received video data based on affinities of the viewing user for the online system users identified from the received video data; the online system 140 generates information that visually distinguishes information identifying online system users identified from the received video data having at least a threshold position in the ranking from information identifying other online system users identified from the received video data. In another embodiment, the online system 140 generates information that presents information identifying an online system user identified from the received video data based on the affinity of the viewing user for the online system user identified from the received video data.

The receiving client device 110B presents 420 the video data from the online system 140 via a display device 115, allowing the sending client device 110A to provide video data for presentation to the receiving client device 110B. Information from the online system 140 identifying users of the online system 140 is presented by the receiving client device 110B in conjunction with the video data. From the presented video data, the receiving client device 110B receives 425 a selection of a user of interest from the viewing user and transmits 430 information identifying the user of interest to the online system 140. The viewing user may select an object of interest in various embodiments. For example, the viewing user selects information identifying the user of interest from information identifying users of the online system 140 presented in conjunction with the video data and the receiving client device 110B and the receiving client device 110B transmits 430 the information identifying the user of interest to the online system 140. The viewing user may select information identifying the user of interest from information describing users included in the video data and presented by the receiving client device 110B along with the video data. Alternatively, the viewing user selects a portion of the presented video data including a person, and the receiving client device 110B identifies the selected portion of the presented video data to the online system 140, which compares content of the selected portion of the video data to stored images of faces or bodies associated with users (e.g., images included in user profiles, images maintained by the online system 140 in which various users are identified) and identifies a user associated with one or more stored images matching the content of the selected portion of the video as the user of interest.

The online system 140 transmits 435 information identifying the user of interest to the sending client device 110A. Based on the information identifying the user of interest and characteristics of objects included in the video data captured 405 by the image capture device 117, the controller 210 modifies 440 captured video data or parameters of the image capture device 117 of the sending client device 110A to more prominently present the user of interest. The modification may occur after a notification regarding how the captured video may be changed is displayed at the client device 110A for the review and authorization by the user being captured and/or based on a pre-authorization of such changes (e.g., through privacy settings) with respect to a list of pre-authorized persons who control the receiving client device 110B. The modifications may include modifying parameters of the image capture device 117 to increase magnification on a portion of the video data including the user of interest or to remove portions of the video data that do not include the user of interest. In various embodiments, the controller 210 of the sending client device 110A applies one or more of the models further described above to captured video data to modify 440 the captured video data to more prominently present the user of interest. The video data modified to prominently present the user of interest is transmitted 445 from the sending client device 110A to the online system 140, which transmits 450 the video data prominently presenting the user of interest to the receiving client device 110B, which presents 455 the modified video data to the viewing user.

The controller 210 may apply one or more models to video data captured after receiving information identifying the user of interest to modify one or more parameters of the image capture device 117 to follow the user of interest around the local area. For example, the controller 210 applies one or more facial recognition models to people located in captured video data to identify a person's face matching a face of the user of interest (received from the online system 140, or identified from previously captured 405 video data based on information from the online system) and subsequently repositions a focal point of the image capture device 117 to the person having the face matching the face of the user of interest. Alternatively, the controller 210 extracts a color map from captured video data including the user of interest and repositions the focal point of the image capture device 117 so the extracted color map remains included in video data captured by the image capture device 117. In some embodiments, the controller 210 receives information identifying the user of interest and subsequently modifies the image capture device 117 to track the identified person or the object, allowing video data captured by the image capture device 117 to track movement of the identified person or object.

In various embodiments, the viewing user provides additional instructions to modify the video data presented by the display device 115 of the receiving client device 110B to the online system 140, which transmits the instructions to the sending client device 110A. Based on the instructions from the online system 140, the controller 210 of the sending client device 110A modifies one or more parameters of the image capture device 117 or modifies video data captured 405 by the image capture device 117. For example, an instruction provided by the viewing user via the online system 140 causes the controller 210 to configure the image capture device 117 of the sending client device 110A so the image capture device 117 is repositioned as the user of interest moves within the field of view of the image capture device 117. As another example, an instruction provided by the viewing user via the online system 140 identifies an object within the video data captured 405 by the image capture device 117 of the sending client device 110A and presented via the receiving client device 110B. When the sending client device 110A receives the instruction from the online system 140, the controller 210 modifies captured video data or modifies one or more parameters of the image capture device 117 so captured video data subsequently provided to the additional client device 110 includes the identified object. This allows the viewing user to provide instructions to the sending client device 110A that modifies the video data captured by the image capture device 117 of the sending client device 110A and presented to the viewing user via the receiving client device 110B. In various embodiments, the viewing user may provide instructions to the online system 140 for communication to the sending client device 110A to modify video data captured by the sending client device 110A without identifying a user of interest from the video data captured by the sending client device 110A and presented 425 by the receiving client device 110B. This allows the viewing user to alter the video data captured 405 by the sending client device 110A.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining one or more models at a client device, each model applying one or more rules to locate users in video data captured by an image capture device of the client device and to determine one or more of the located users to show in the captured the video data;
   capturing video data of a local area within a field of view of the image capture device included in the client device;
   locating multiple users in the captured video data;
   applying one or more of the maintained models to the captured video data;
   modifying the captured video data to show one or more of the located users based on application of the one or more of the maintained models, the modifying comprising:
   determining locations within the captured video data where gazes of the one or more located users are directed from application of one or more maintained models; and
   modifying a focal point of the image capture device to a located person to whom gazes of at least a threshold amount of the one or more located users are directed; and
   transmitting the modified video data from the client device to an online system.

2. The method of claim 1, wherein modifying the captured video data to show one or more of the located users based on application of the one or more of the maintained models further comprises:
   modifying one or more parameters of the image capture device based on application of the one or more of the maintained models; and
   capturing additional video data of the local area using the modified one or more parameters of the image capture device.

3. The method of claim 1, wherein modifying the captured video data to show one or more of the located users based on application of the one or more of the maintained models further comprises:
   determining distances between different users located within the captured video data; and
   modifying the focal point of the image capture device so additional captured video data includes users within a threshold distance of each other.

4. The method of claim 1, wherein modifying the captured video data to show one or more of the located users based on application of the one or more of the maintained models further comprises:
   capturing audio data via an audio capture device included in the client device;
   determining a source of the audio data within the local area by applying one or more of the maintained models to the captured audio data and to the captured video data;
   determining the source of the audio data within the local area is a user; and
   modifying the focal point of the image capture device to the source of the audio data in response to determining the source of the audio data within the local area is the user.

5. The method of claim 1, wherein modifying the captured video data to show one or more of the located users based on application of the one or more of the maintained models further comprises:
   identifying movement of a located user from application of one or more of the maintained models; and
   modifying a field of view of the image capture device based on identified movement of the located user.

6. The method of claim 5, wherein identifying movement of the located user from application of one or more of the maintained models comprises:
   identifying the located user is gesturing towards an object included in the local area.

7. The method of claim 6, wherein modifying the field of view of the image capture device comprises:
   decreasing a magnification of the image capture device so additional video data captured by the image capture device includes the located user and the object towards which the located user is gesturing.

8. The method of claim 5, wherein identifying movement of the located user from application of one or more of the maintained models comprises:

determining the located user is holding an object in the local area from application of the one or more maintained models;

9. The method of claim 8, wherein modifying the field of view of the image capture device comprises:
changing the focal point of the image capture device to the object and increasing a magnification of the image capture device.

10. The method of claim 1, wherein modifying the captured video data to show one or more of the located users based on application of the one or more of the maintained models further comprises:
modifying the captured video data so each located user is presented within the captured video data with at least a threshold set of dimensions for at least a threshold amount of time.

11. The method of claim 1, wherein modifying the captured video data to show one or more of the located users based on application of the one or more of the maintained models further comprises:
modifying the captured video data so each located user is presented within the captured video data for at least a threshold amount of time.

12. The method of claim 1, wherein modifying the captured video data to show one or more of the located users based on application of the one or more of the maintained models further comprises:
identifying a face of a user within the captured video data from application of one or more of the maintained models;
modifying the captured video data to remove portions of the captured video data that do not include the face of the user.

13. The method of claim 1, wherein modifying the captured video data to show one or more of the located users based on application of the one or more of the maintained models further comprises:
modifying the captured video data to include each of the located users.

14. The method of claim 1, wherein modifying the captured video data to show one or more of the located users based on application of the one or more of the maintained models further comprises:
stabilizing the captured video data by application of the one or more maintained models.

15. The method of claim 1, wherein modifying the captured video data to show one or more of the located users based on application of the one or more of the maintained models further comprises:
comparing a located user within the captured video data to stored data describing users included in the captured video data who have previously been presented with at least a threshold set of dimensions by the captured video data; and
modifying the captured video data to prominently present the located person in response to the comparison determining the identified user does not match a user included in the captured video data who had previously been with at least a threshold set of dimensions by the captured video data.

16. A computer program product comprising a non-transitory computer readable storage medium having instructions encoded thereon that, when executed by a processor, cause the processor to:
maintain one or more models at a client device, each model applying one or more rules to locate users in video data captured by an image capture device of the client device and to determine one or more of the located users to show in the captured the video data from characteristics of the video data;
capture video data of a local area within a field of view of the image capture device included in the client device;
locate multiple users in the captured video data;
apply one or more of the maintained models to the captured video data;
modify the captured video data to show one or more of the located users based on application of the one or more of the maintained models, the modify comprising:
determine locations within the captured video data where gazes of the one or more located users are directed from application of one or more maintained models; and
modify a focal point of the image capture device to a located person to whom gazes of at least a threshold amount of the one or more located users are directed; and
transmit the modified video data from the client device to an online system.

17. The computer program product of claim 16, wherein modify the captured video data to show one or more of the located users based on application of the one or more of the maintained models further comprises:
determine distances between different users located within the captured video data; and
modify the focal point of the image capture device so additional captured video data includes people within a threshold distance of each other.

18. The computer program product of claim 16, wherein modify the captured video data to show one or more of the located users based on application of the one or more of the maintained models further comprises:
capture audio data via an audio capture device included in the client device;
determine a source of the audio data within the local area by applying one or more of the maintained models to the captured audio data and to the captured video data;
determine the source of the audio data within the local area is a located user; and
modify the focal point of the image capture device to the source of the audio data in response to determining the source of the audio data within the local area is the located user.

19. A device comprising:
an image capture device;
one or more processors; and
memory storing one or more programs for execution by the one or more processors, the one or more programs including instructions that, when executed by the one or more processors, cause the client device to:
maintain one or more models at a client device, each model applying one or more rules to locate users in video data captured by an image capture device of the client device and to determine one or more of the located users to show in the captured the video data from characteristics of the video data;
capture video data of a local area within a field of view of the image capture device included in the client device;
locate multiple users in the captured video data;
apply one or more of the maintained models to the captured video data;

modify the captured video data to show one or more of the located users based on application of the one or more of the maintained models, the modify comprising:
  determine locations within the captured video data where gazes of the one or more located users are directed from application of one or more maintained models; and
  modify a focal point of the image capture device to a located person to whom gazes of at least a threshold amount of the one or more located users are directed; and
transmit the modified video data from the client device to an online system.

20. The device of claim 19, wherein modify the captured video data to show one or more of the located users based on application of the one or more of the maintained models further comprises:
  modify one or more parameters of the image capture device based on application of the one or more of the maintained models; and
  capture additional video data of the local area using the modified one or more parameters of the image capture device.

21. The device of claim 19, wherein modify the captured video data to show one or more of the located users based on application of the one or more of the maintained models further comprises:
  identify movement of a located user from application of one or more of the maintained models; and
  modify a field of view of the image capture device based on identified movement of the located user.

22. The device of claim 19, wherein modify the captured video data to show one or more of the located users based on application of the one or more of the maintained models further comprises:
  modify the captured video data so each located user is presented within the captured video data with at least a threshold set of dimensions for at least a threshold amount of time.

* * * * *

UNITED STATES PATENT AND TRADEMARK OFFICE
CERTIFICATE OF CORRECTION

PATENT NO. : 10,666,857 B2
APPLICATION NO. : 16/121087
DATED : May 26, 2020
INVENTOR(S) : Vincent Charles Cheung Page 1 of 1

It is certified that error appears in the above-identified patent and that said Letters Patent is hereby corrected as shown below:

On the Title Page

Item (56), Column 2, under "U.S. Patent Documents", Line 1, after "Whyte" insert -- et al. --.

In the Claims

Column 25, Line 57, Claim 1, delete "the captured the video data;" and insert -- the captured video data; --.

Column 28, Line 2, Claim 16, delete "the captured the video data;" and insert -- the captured video data; --.

Column 28, Line 60, Claim 19, delete "the captured the video data;" and insert -- the captured video data; --.

Signed and Sealed this
Eighth Day of December, 2020

Andrei Iancu
*Director of the United States Patent and Trademark Office*